(12) United States Patent
Gerard et al.

(10) Patent No.: US 7,513,379 B2
(45) Date of Patent: Apr. 7, 2009

(54) FUEL TANK AND METHOD FOR MAKING SAME

(75) Inventors: Yannick Gerard, Kraainem (BE);
Stéphane Leonard, Brussels (BE);
François Dougnier, Boortmeerbeek (BE)

(73) Assignee: Inergy Automotive Systems Research (Société Anonyme, Brussels (BE)

( * ) Notice: Subject to any disclaimer, the term of this patent is extended or adjusted under 35 U.S.C. 154(b) by 464 days.

(21) Appl. No.: 10/492,528

(22) PCT Filed: Oct. 22, 2002

(86) PCT No.: PCT/EP02/11905

§ 371 (c)(1),
(2), (4) Date: Jun. 8, 2004

(87) PCT Pub. No.: WO01/07806

PCT Pub. Date: Feb. 1, 2001

(65) Prior Publication Data

US 2005/0067415 A1    Mar. 31, 2005

(30) Foreign Application Priority Data

Oct. 24, 2001 (FR) .................................. 01 13930

(51) Int. Cl.
*B65D 1/40* (2006.01)
*B65D 11/00* (2006.01)
*B60P 3/00* (2006.01)

(52) U.S. Cl. ..................... 220/62.11; 220/562; 53/397

(58) Field of Classification Search ................... 53/397

See application file for complete search history.

(56) References Cited

U.S. PATENT DOCUMENTS

| 1,704,760 | A |   | 3/1929 | Parker |
| 3,474,775 | A | * | 10/1969 | Johnson ...................... 600/397 |
| 3,680,727 | A |   | 8/1972 | Pearson |
| 4,366,972 | A |   | 1/1983 | Franklin |
| 5,020,572 | A |   | 6/1991 | Hunt |
| 5,110,040 | A |   | 5/1992 | Kalberer et al. |
| 5,732,743 | A |   | 3/1998 | Livesay |
| 5,951,059 | A | * | 9/1999 | Kitamura ..................... 285/24 |
| 6,035,883 | A |   | 3/2000 | Benjey |
| 6,306,781 | B1 |  | 10/2001 | McGrath |
| 6,467,643 | B1 | * | 10/2002 | Sadr ........................... 220/562 |
| 6,742,536 | B2 |  | 6/2004 | Mills |
| 6,843,267 | B1 | * | 1/2005 | Van Schaftingen et al. .. 137/202 |

(Continued)

FOREIGN PATENT DOCUMENTS

EP          0 312 045         4/1989

(Continued)

OTHER PUBLICATIONS

U.S. Appl. No. 11/721,876, filed Jun. 15, 2007, Leonard.

*Primary Examiner*—Anthony D. Stashick
*Assistant Examiner*—Shawn M. Braden
(74) *Attorney, Agent, or Firm*—Oblon, Spivak, McClelland, Maier & Neustadt, P.C.

(57) ABSTRACT

In a fuel tank and a process for manufacturing the fuel tank, accessories emerging through the wall of the tank are covered by a flexible film of multilayer structure that includes a fuel barrier layer. The perimeter of the film is welded to the wall of the tank.

22 Claims, 2 Drawing Sheets

U.S. PATENT DOCUMENTS

Figure 1:
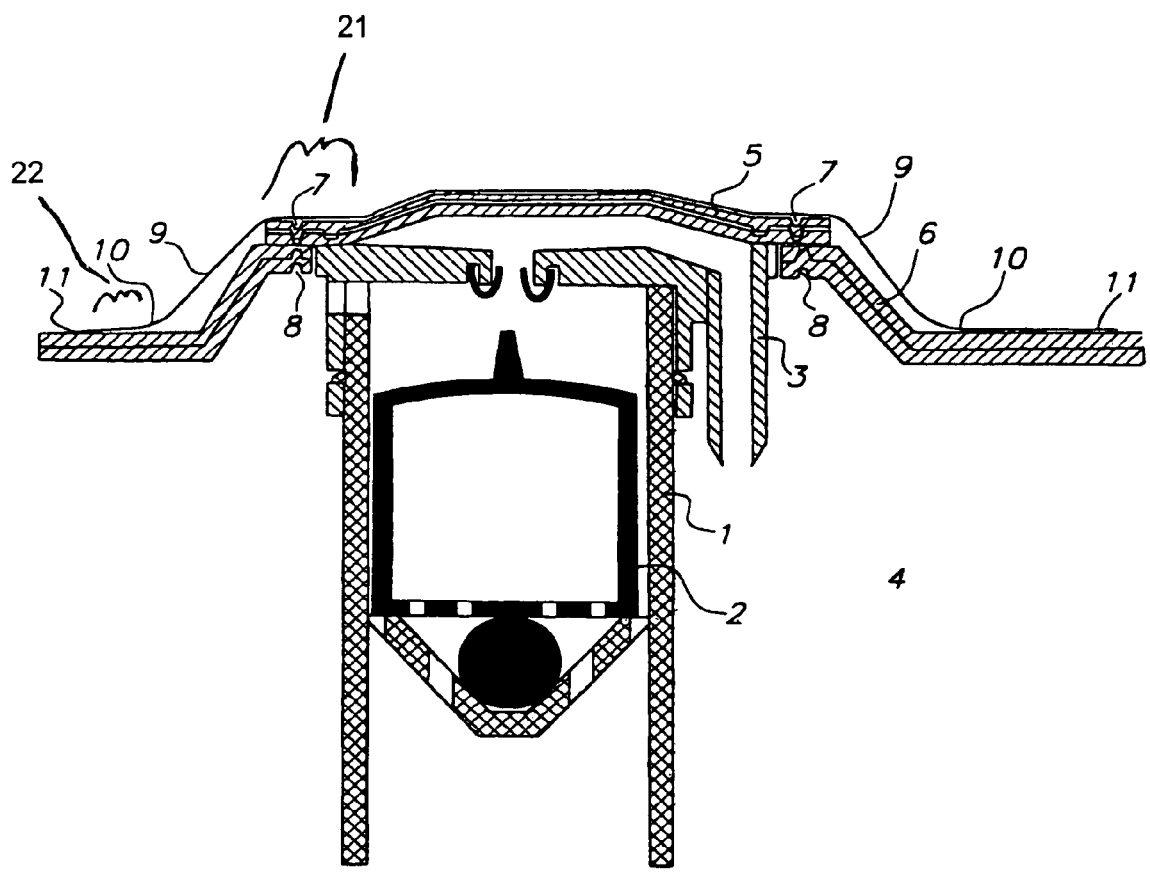

| | | |
|---|---|---|
| 6,915,812 B2 | 7/2005 | Engle et al. |
| 7,105,121 B2 * | 9/2006 | Sadr .......................... 264/266 |
| 2003/0098062 A1 | 5/2003 | Frohwein |
| 2004/0256587 A1 | 12/2004 | Gerard et al. |
| 2005/0067415 A1 | 3/2005 | Gerard et al. |

FOREIGN PATENT DOCUMENTS

| | | |
|---|---|---|
| EP | 941884 | 9/1999 |
| EP | 1 179 445 | 2/2002 |
| FR | 2 576 525 | 8/1986 |
| WO | 01/07806 | 2/2001 |
| WO | 01/21428 | 3/2001 |
| WO | WO 0121428 A1 * | 3/2001 |
| WO | 03/035423 | 5/2003 |

* cited by examiner

FUEL TANK AND METHOD FOR MAKING SAME

The present invention relates to a plastic fuel tank impermeable to gases and to liquids.

Plastic fuel tanks used in the industry, particularly in the automotive industry for equipping vehicles, generally include one or more accessories with which they are associated, such as aeration and venting valves, take-up siphons, various sensors and their various connections, gauge-and pumping modules, etc.

Moreover, fuel tanks must meet increasingly stringent sealing and permeability standards. The limits of permitted emissions have become so low that losses associated with leakages and with the permeability of the interfaces of the accessories with the tank have assumed a higher relative proportion in the total losses from the tank/accessories system.

It is known, from Patent Application WO 01/21428, to close off the openings in the multilayer plastic tank that are made for introducing or fitting an accessory in the tank by means of a sheet of multilayer structure that is compatible with that of the tank, this sheet being welded to the outer wall of the latter.

However, in that document it is disclosed that the sheets used have a stiffness close to that of the walls of the tank. It follows that these sheets cannot be easily used when the emergent portion of an accessory is too bulky, or when the emergent surface of the accessory is irregular.

In addition, despite the bulging that can be produced near the edge of the sheet in order to locally reduce the thickness of the plastic layers constituting the multilayer sheet, the level of fuel losses by emission at the point where the sheet is welded to the tank still often remains too high and sometimes even exceeds the very low limits imposed by the latest environmental standards.

It is an object of the invention to provide a plastic tank that limits even further the losses of fuel at the interfaces of the accessories with the environment and, in particular at the interfaces of the accessories with the tank, if these accessories pass through the wall of the tank.

Another advantage of the invention is that it allows a system for fixing the accessory to the tank which is independent of t he high impermeability requirements imposed on the tank/accessories assembly.

For this purpose, the invention relates to a plastic fuel tank provided with at least one accessory located at least partly on the outside of the tank, the accessory being covered by a protective device that improves the impermeability of the tank/accessories assembly, in which this device is a flexible film of multilayer structure that includes at least one fuel barrier layer, which film is fastened to the tank by welding it to the outer surface of the said tank over the entire periphery of the film.

The term "fuel tank" is understood to mean any type of tank capable of storing a liquid and/or gaseous fuel under varied temperature and pressure conditions. More particularly intended are tanks of the type of those encountered in motor vehicles. The term "motor vehicle" is understood to include cars, motorcycles and lorries.

The term "plastic" is understood to mean any material comprising at least one synthetic resin polymer.

All types of plastic may be suitable. Particularly suitable plastics belong to the group of thermoplastics.

The term "thermoplastic" is understood to mean any thermoplastic polymer, including thermoplastic elastomers, as well as blends thereof. The term "polymer" is understood to mean both homopolymers and copolymers (especially binary or ternary copolymers). Examples of such copolymers are, nonlimitingly, random copolymers, linear block copolymers, other block copolymers, and graft copolymers.

Any type of thermoplastic polymer or copolymer whose melting point is below the decomposition temperature is suitable. Synthetic thermoplastics having a melting range spread over at least 10 degrees Celsius are particularly suitable. Examples of such materials are those exhibiting polydispersion in their molecular mass.

In particular, polyolefins, vinyl polyhalides, thermoplastic polyesters, polyketones, polyamides and copolymers thereof may be used. A blend of polymers or copolymers may also be used, as may a blend of polymeric materials with inorganic, organic and/or natural fillers such as, for example, but not limitingly, carbon, salts and other inorganic derivatives, and natural or polymeric fibres. It is also possible to use multilayer structures consisting of stacked layers fastened together, comprising at least one of the polymers or copolymers described above.

Polyolefins have given good results. Among polyolefins, high-density polyethylene (HDPE) is preferred.

The invention applies to a tank provided with at least one accessory-located at least partly on the outside of the tank. The term "accessory" is understood to mean in general any member via which liquid or gas passes, or one in contact with liquid or gas, and which fulfils a particular function specific to the fuel device of which the tank forms part, including a function of transporting liquid and/or gas between two other members.

Examples of such accessories comprise, not limitingly, the following:
   a container that contains any chemical or physical composition, especially a vapour absorption canister;
   a liquid or gas gauge;
   an electrical connection terminating, in a liquid or gas gauge;
   a liquid or gas pump;
   a safety valve for controlled closure of the tank under certain particular conditions;
   a drainable container for receiving liquid;
   an electrical connection for supplying the motor of a liquid or gas pump;
   a liquid pipe terminating in a supply device for any device, especially an engine;
   a liquid/vapour separation device.

Any combination of at least two accessories may be used, optionally in the presence of several examples of the same accessory.

According to the invention, the accessory is located at least partly on the outside of the tank. The accessory may be located completely on the outside of the tank. One example is a module mounted on a wall of the tank and fulfilling a particular function involving the presence of fuel. The accessory may also be located only partly outside the tank. In this case, it passes through the wall of the latter and is provided with an interface with this wall that ensures relative sealing with respect to gases and liquids.

According to the invention, the accessory is covered by a protective device which improves the impermeability of the tank/accessories assembly. In other words, the presence of the protective device significantly reduces the losses of fuel at the surface of the accessory and/or at the interface of the latter with the tank, if the accessory passes through the wall of the tank.

According to the invention, this device is a flexible film of multilayer structure, that is to say a laminated structure resulting from stacking several layers each comprising at least one thermoplastic, the thickness and the nature of the layers of which stack are such that the flexibility of the film is substantially greater than that of the wall of the tank. Preferably, the flexible film can be easily deformed, by simple manual action.

The flexible film has a surface of various types. For example, it may constitute a convex surface whose shape is defined by relatively circular or elliptical curved lines, or on the contrary has sharp angles such as rectangular or polygonal shapes. The flexible film may also have a non-convex surface that includes at least one convex surface located on the inside of the surface of the film. In each of these convex surfaces included in the non-convex surface of the film, the multilayer structure is interrupted in order to leave room for a void enclosed in the non-convex surface.

According to the invention, the flexible film includes at least one fuel barrier layer. The term "fuel barrier layer" is understood to mean a layer impermeable to gaseous and liquid fuels. The barrier layer generally includes a barrier resin. Any known barrier resin may be present in the barrier layer, provided that it is effective against fluid fuels liable to be in contact with the tank and/or the accessory, particularly hydrocarbons, and provided that it is compatible with the technique used to manufacture the multilayer flexible film structure.

Among possible resins, mention may be made, non-limitingly, of polyamides or copolyamides, and ethylene/vinyl alcohol random copolymers. A blend of various barrier resins is also possible. Very good results have been obtained with a barrier layer comprising a barrier resin made of an ethylene/vinyl alcohol random copolymer.

The flexible film may have been obtained by any known technique resulting in the manufacture of a thin flexible multilayer structure. One possible technique is the technique of extruding a multilayer film through a sheet die. Another possible technique is compression moulding a multilayer sheet.

The flexible film covering the accessory of the tank according to the invention is fastened to the tank by welding. The flexible film may, for example, form a pocket trapping an accessory, which is welded to the tank.

In the case of tanks according to the invention, the flexible film is welded locally to the outer surface of the tank, over the entire periphery of the film.

The welding of the flexible film may be carried out in a variety of ways. All types of welding compatible with the plastics to be assembled are suitable. Preferably, the welding is of the laser or infrared radiation welding type. In this case, the film may advantageously be welded over a broader peripheral region than with other types of welding. A width of 10 to 20 mm for example is possible with laser radiation welding.

In a preferred embodiment of the tank according to the invention, at least one layer of the flexible film that is not provided with a barrier function is thinned around the periphery of the film over a distance at least equal to the width of the welding region. In this embodiment, the thickness of the layer not provided with a barrier function is reduced around the periphery of the flexible film in such a way that, at least in the welded region on the wall of the tank, the cross section of the fuel permeation channel is reduced. Particularly preferably, the layer or layers not provided with a barrier function that are located between the tank and the barrier layer are thinned.

According to another embodiment compatible with the embodiments described above, the layer of the flexible film which is directly in contact with the wall of the tank comprises a composition opaque to the laser radiation or to the infrared radiation. Advantageously, this embodiment provides tanks in which the welding of the flexible film by means of laser radiation or infrared radiation is of higher quality. The expression "composition opaque to laser or infrared radiation" is understood to mean a composition that absorbs and/or reflects a substantial proportion of the laser or infrared radiation energy. An example of such a composition that has given good results is a carbon black filler. This composition is advantageously distributed uniformly throughout the polymeric material of the layer directly in contact with the wall of the tank.

Another embodiment of the tank according to the invention, compatible also with one or more of the embodiments described above, is that in which the flexible film comprises at least one layer containing a polyolefin. Preferably, the polyolefin is high-density polyethylene (HDPE). Particularly preferably, the polyethylene-containing layer also includes a composition opaque to laser radiation or infrared radiation. An HDPE layer containing carbon black has given excellent results.

The flexible film may completely cover the accessory so as to remove any direct contact between this accessory and the atmosphere outside the tank.

Alternatively, the flexible film may also be placed in such a way that the accessory comprises a pipe which opens to the atmosphere external to the tank and in such a way that the film allows only the pipe to run out into this atmosphere. In such a case, a means of fastening the film to the pipe at the outlet interface of the latter with the film is corporated. Various fastening means are possible, provided that they provide a sealing contact better than that at the interface of the end of the pipe located beneath the film with the tank or an accessory thereof. Fastening means that have given good results are a snap-fastening system and a system consisting of a threaded screw on the pipe and of a ring screwed onto the latter, trapping the film in the threads of the screw, between the ring and the thread on the pipe.

The invention also relates to a process for manufacturing a plastic fuel tank provided with at least one accessory connected to the internal space of the tank via at least one opening in the wall of this tank, the accessory and/or the opening being covered by an impermeable protective device, in which there is placed, over the accessory, a thin film of multilayer structure that icludes at least one fuel barrier layer, the film then being welded over its entire periphery to the tank by making laser or infrared radiation scan this peripheral region.

In this process, the common terms have the same meaning as that given above in the description of the tank.

According to one method of implementing the process according to the invention, the film is scored and preformed by thermoforming, independently of the fuel tank, before welding it to the tank by means of laser or infrared radiation.

The preforming of the flexible film by thermoforming consists in giving it a shape which, while still remaining flexible and consequently modifiable to a certain extent without substantial mechanical forces, approaches the shape of the outer surface of the accessory to be protected. Preferably, the preforming of the flexible film is carried out by plastic deformation.

According to another method of implementing the process according to the invention, compatible with the embodiments described above, before carrying out the welding, the film is pressed against the accessory and the wall of the tank in the vicinity of this accessory by means of a stream of hot air.

Advantageously, the stream of hot air may be delivered by means of a pipe with a diameter close to the width of the accessory, this pipe being directed towards this accessory.

The figures that follow have the purpose of illustrating the invention, without seeking to restrict its scope.

FIG. 1 illustrates a venting valve (1) of circular geometry, comprising a skirt (2) made of polyacetal. The valve (1) is held in place by being clipped onto a siphon (3), the nozzle of which is connected to a pipe for the internal ventilation of a multilayer fuel tank (4). A sheet (5) of multilayer structure comprising two HDPE layers trapping an EVOH barrier layer was welded by hot-plate welding to the external surface (6) of the wall of the tank (4). Embossments (7) and (8) were made in the sheet (5) and the surface (6) of the wall of the tank (4) so as to allow the barrier layers to come together during the welding of the sheet (5) to the tank (4) and the siphon (3). A three-layer multilayer film (9) of circular shape, with a total thickness of 0.3 mm, comprising an EVOH barrier layer sandwiched between two HDPE layers, the HDPE layer facing the tank (4) being filled with 0.25% by weight of carbon black, was positioned above the sheet (5) and welded by scanning with diode laser radiation used in pulsed mode (FAIP-type YAG laser with a wavelength of 809 nm and a power of 35 W) over a circular region (10), (11) with a width of 16 mm of the outer wall of the tank surrounding the valve (1) and the siphon (3). A first part (21) of the film (9) faces the sheet (5) at the embossment (7). A second part (22) of the film (9) faces the fuel tank (4) at the circular region (10).

Figure 2:
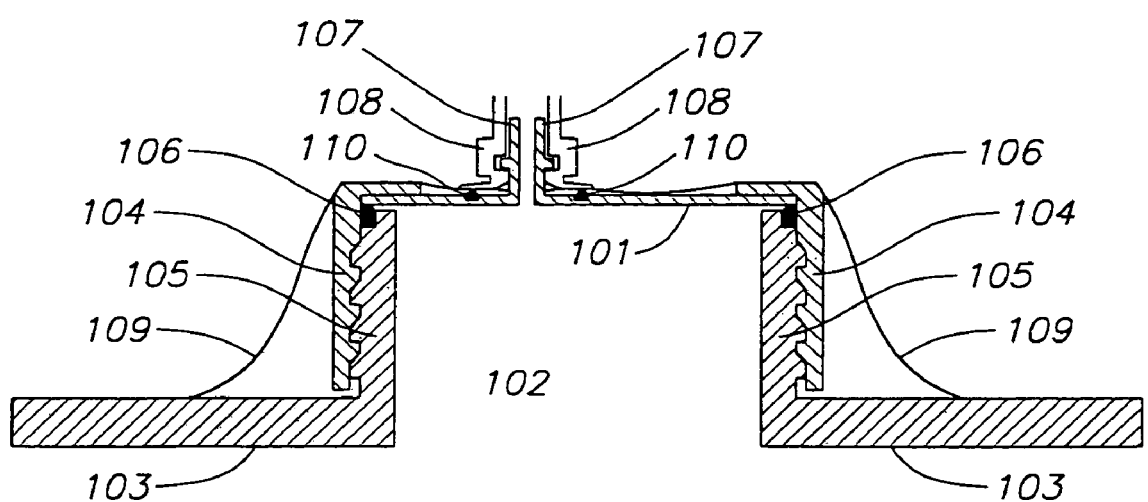

FIG. 2 illustrates the covering of a ring-nut-type stopper used for fitting a pump-gauge module for an HDPE fuel tank (103). A support plate (101) has been positioned over an opening (102) made in a tank (103). A ring-nut system (104) screwed onto an end-fitting (105) defining the walls of the opening (102) allows the mounting plate (101) to be fastened to the tank (103). A flexible seal (106) provides a first level of sealing.

A siphon (107) passing through the support plate (101) allows a fitting (108) to be fitted by snap-fastening onto the fuel outflow line.

A combination of the end-fitting (105), the ring-nut system (104) and the support plate (101) is covered by a 0.3 mm thick film (109) having a multilayer structure comprising an EVOH barrier layer sandwiched between two HDPE layers, the HDPE layer of which that is in contact with the tank is an HDPE layer filled with 0.3% by weight of carbon black. The film (109) is provided with an opening allowing passage of the siphon (107) and is welded by the technique of scanning by means of laser radiation of the same type and the same power as that used to weld the film described in FIG. 1. The welding was carried out at the external surface of the tank (103) over a circular region 15 mm in width. A seal (110) provides sealing around the siphon (107) during snap-fastening of the female part of the fitting (108).

The invention claimed is:

1. A process for manufacturing a plastic fuel tank, said process comprising: forming a fuel tank with a wall defining at least one opening: placing at least one accessory at least partly outside the fuel tank such that said fuel tank and said accessory form an interface between said fuel tank and said accessory: forming a thin film of multilayer structure that includes at least one fuel barrier layer that is impermeable to gaseous and liquid fuels, said thin film having a flexibility substantially greater than that of said wall of said fuel tank; placing said thin film over said interface between said fuel tank and said accessory so that said fuel tank is sealed from an outside atmosphere at said interface by said fuel barrier layer of said thin film: and welding an entire outer periphery of the thin film directly to the tank around said opening of said fuel tank thereby connecting a first part of the film directly to the accessory such that the thin film extends across a seam between the accessory and the tank, wherein said forming of the thin film is preformed by thermoforming, independently of the forming of the fuel tank, before the welding of the thin film to the fuel tank.

2. The process according to claim 1, further comprising, before the welding of the thin film to the fuel tank, pressing the thin film against the at least one accessory and the wall of the tank in a vicinity of the at least one accessory by a stream of hot air.

3. A process according to claim 1, wherein said welding of the thin film to the fuel tank is performed by laser radiation welding.

4. A process according to claim 1, wherein said welding of the thin film to the fuel tank is performed by infrared radiation welding.

5. The process according to claim 1, wherein said forming of the thin film comprises incorporating a non-barrier layer to said multilayered structured, the method further comprising thinning a portion of said non-barrier layer around the outer periphery of the thin film over a distance at least equal to a width of a welding region.

6. The process according to claim 1, wherein the forming of the thin film comprises incorporating a composition opaque to a laser radiation or to infrared radiation into a layer of the thin film to be directly in contact with the wall of the fuel tank.

7. The process according to claim 1, wherein the forming of the thin film comprises incorporating into the film at least one layer containing a polyolefin.

8. A process for manufacturing a plastic fuel tank, said process comprising: forming a fuel tank with a wall defining at least one opening; placing at least one accessory at least partly outside the fuel tank such that said fuel tank and said accessory form an interface between said fuel tank and said accessory; forming a thin film of multilayer structure that includes at least one fuel barrier layer that is impermeable to gaseous and liquid fuels, said thin film having a flexibility substantially greater than that of said wall of said fuel tank; placing said thin film over said interface between said fuel tank and said accessory so that said fuel tank is sealed from an outside atmosphere at said interface by said fuel barrier layer of said thin film; and welding an entire outer periphery of the thin film directly to the tank around said opening of said fuel tank thereby connecting a first part of the film directly to the accessory such that the thin film extends across a seam between the accessory and the tank, wherein the placing of said thin film is performed such that the thin film completely covers the at least one accessory to remove any direct contact between the at least one accessory and said outside atmosphere.

9. The process according to claim 1, wherein the at least one accessory comprises a pipe that opens the atmosphere external to the fuel tank, and wherein the placing of said thin film is performed such that the thin film allows only the pipe to run out into the external atmosphere.

10. The process according to claim 1, wherein: the forming of said thin film comprises forming an opening in said thin film, said thin film opening being defined by an inner periphery for said thin film, and the placing of said thin film is performed such that said thin film extends from said inner periphery of said thin film.

11. The process according to claim 10, wherein the placing of said thin film is performed such that said thin film includes a portion between said inner periphery and said outer periphery that is not bonded to said fuel tank nor to said at least one accessory.

12. The process according to claim 1, wherein the placing of said thin film is performed such that said thin film includes a portion that seals said interface, wherein said portion is not directly bonded to said fuel tank nor to said accessory.

13. The process according to claim 1, wherein the placing of said thin film is performed such that said thin film has a portion with said fuel barrier layer over said interface, wherein said portion of said film is not bonded to said fuel tank nor to said accessory.

14. The process according to claim 10, wherein the placing of said thin film is performed such that said interface is sealed by said fuel barrier layer of said thin film around an entire periphery of said interface around said fuel tank.

15. A process for manufacturing a plastic fuel tank, said process comprising: forming a fuel tank with a wall defining at least one opening: placing at least one accessory at least partly outside the fuel tank such that said fuel tank and said accessory form an interface between said fuel tank and said accessory; forming a thin film of multilayer structure that includes at least one fuel barrier layer that is impermeable to gaseous and liquid fuels, said thin film having a flexibility substantially greater than that of said wall of said fuel tank; placing said thin film over said interface between said fuel tank and said accessory so that said fuel tank is sealed from an outside atmosphere at said interface by said fuel barrier layer of said thin film; and welding an entire outer periphery of the thin film directly to the tank around said opening of said fuel tank thereby connecting a first part of the film directly to the accessory such that the thin film extends across a seam between the accessory and the tank, wherein said accessory includes an accessory fuel barrier layer that at least partially covers said opening of said fuel tank, and wherein said fuel barrier layer of said thin film covers said accessory fuel barrier layer so that said accessory fuel barrier layer and said fuel barrier layer of said thin film provide a double sealing for said opening of said fuel tank.

16. The process according to claim 1, wherein said accessory is attached to said fuel tank such that said interface between said fuel tank and said accessory has a portion outside said fuel tank and said fuel barrier layer of said thin film seals said portion of said interface outside said fuel tank.

17. The process according to claim 1, wherein the placing of the thin film includes placing the thin film in direct contact with an outermost surface of the tank and in direct contact with an outermost surface of the accessory.

18. The process according to claim 17, wherein the first part of the film overlaps the accessory and the tank so as to sandwich the accessory between the first part and the tank, and a second part of the film does not overlap the accessory.

19. A process for manufacturing a plastic fuel tank, said process comprising:
forming a fuel tank with a wall defining at least one opening;
placing at least one accessory at least partly outside the fuel tank such that said fuel tank and said accessory form an interface between said fuel tank and said accessory;
forming a thin film of multilayer structure that includes at least one fuel barrier layer that is impermeable to gaseous and liquid fuels, said thin film having a flexibility substantially greater than that of said wall of said fuel tank;
placing said thin film over said interface between said fuel tank and said accessory so that said fuel tank is sealed from an outside atmosphere at said interface by said fuel barrier layer of said thin film; and
welding an entire outer periphery of the thin film directly to the tank around said opening of said fuel tank thereby connecting a first part of the film directly to the accessory such that the thin film extends across a seam between the accessory and the tank,
wherein the placing of the thin film includes placing the thin film in direct contact with an outermost surface of the tank and in direct contact with an outermost surface of the accessory,
wherein the thin film is not directly bonded to the accessory.

20. The process according to claim 1, wherein the placing at least one accessory at least partly outside the fuel tank includes welding the accessory directly to the tank.

21. The process according to claim 1, wherein the placing at least one accessory at least partly outside the fuel tank includes mechanically coupling the accessory directly to the tank.

22. The process according to claim 21, wherein the mechanically coupling includes threading the accessory in combination with the tank.

* * * * *